A. J. SPRANGER & B. H. HOURTIENNE.
DEMOUNTABLE RIM.
APPLICATION FILED NOV. 2, 1914.

1,129,913.

Patented Mar. 2, 1915.
2 SHEETS—SHEET 1

Witnesses
Chas W. Stauffiger
Karl H. Butler

Inventors
Anthony J. Spranger
Benjamin H. Hourtienne

By
Attorneys

A. J. SPRANGER & B. H. HOURTIENNE.
DEMOUNTABLE RIM.
APPLICATION FILED NOV. 2, 1914.

1,129,913.

Patented Mar. 2, 1915.
2 SHEETS—SHEET 2.

Witnesses
Chas. W. Stauffiger
Karl H. Butler

Inventors
Anthony J. Spranger
Benjamin H. Hourtienne
By Barthel & Barthel
Attorneys

UNITED STATES PATENT OFFICE.

ANTHONY J. SPRANGER AND BENJAMIN H. HOURTIENNE, OF DETROIT, MICHIGAN, ASSIGNORS TO SPRANGER RIM AND WHEEL COMPANY, OF DETROIT, MICHIGAN, A CORPORATION OF MICHIGAN.

DEMOUNTABLE RIM.

1,129,913.  Specification of Letters Patent.  Patented Mar. 2, 1915.

Application filed November 2, 1914. Serial No. 869,770.

*To all whom it may concern:*

Be it known that we, ANTHONY J. SPRANGER and BENJAMIN H. HOURTIENNE, citizens of the United States of America, residing at Detroit, in the county of Wayne and State of Michigan, have invented certain new and useful Improvements in Demountable Rims, of which the following is a specification, reference being had therein to the accompanying drawings.

This invention relates to a demountable rim for wheels and particularly to a wheel construction that has been especially designed for automobiles and other vehicles.

The primary object of our invention is to provide positive and reliable means, in a manner hereinafter set forth, for easily and quickly attaching a demountable rim to the fixed rim of a wheel, whereby the rim and the tire carried thereby can be placed in position with the use of a single tool and in a manner that prevents accidental displacement of the rim and tire when the wheel is in operation.

A further object of our invention is to provide a demountable rim in the general make up of which the parts are constructed with a view of reducing the cost of manufacture and at the same time retain the features by which safety, durability, simplicity and ease of assembling are secured, and with such ends in view, our invention resides in the novel construction, combination and arrangement of parts to be hereinafter specifically described and then claimed.

Reference will now be had to the drawings, wherein there are illustrated the preferred embodiments of our invention, but it is to be understood that the structural elements to be hereinafter referred to are susceptible to such changes, as in the size, shape and manner of assemblage, as fall within the scope of the appended claims.

Figure 1:
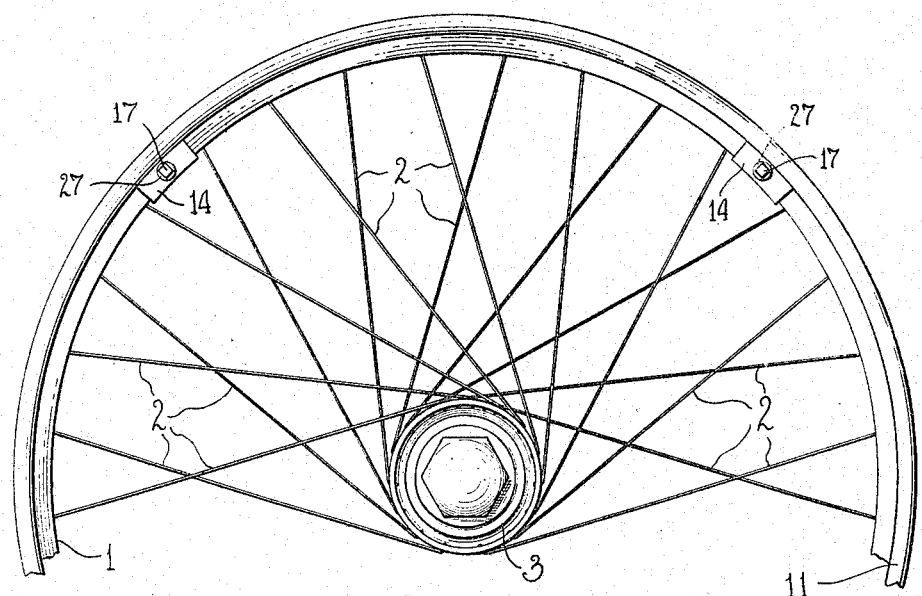
Figure 2:
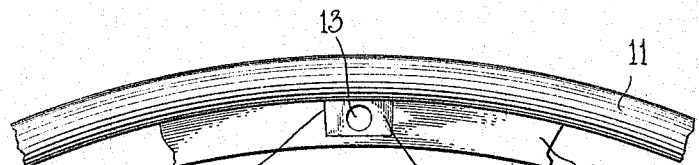
Figure 3:
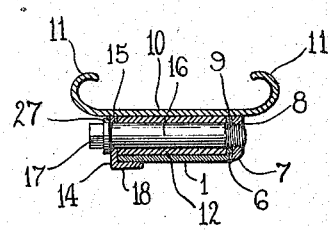
Figure 4:
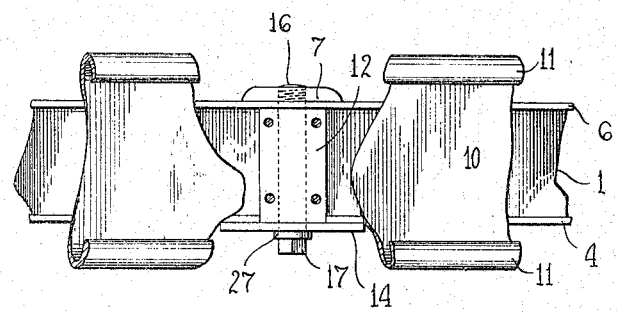
Figure 5:
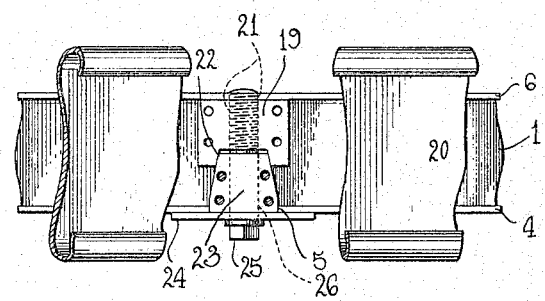

In the drawings—Figure 1 is a side elevation of a portion of a wheel provided with a demountable rim in accordance with our invention; Fig. 2 is an enlarged side elevation of a portion of a demountable rim and fixed rim, with the fastening means thereof removed; Fig. 3 is a cross sectional view of the same showing the fastening means in position; Fig. 4 is a plan of the same partly broken away; Fig. 5 is a similar view illustrating a modification of our invention; and Fig. 6 is a cross sectional view of the same.

Referring first to Figs. 1, 2 and 3, the reference numeral 1 denotes a fixed wheel rim that is channel shaped and to which the spokes 2 of a hub 3 are connected. The outer wall 4 of the fixed rim is provided with spaced openings 5 formed by cutting away the outer edge of the wall to a depth that will allow of the bottom of the opening 5 being flush with the bottom of the channel formed by the fixed rim. The inner wall 6 of the fixed rim has spaced enlargements 7 at points opposite the openings 5 and said enlargements are provided with openings 8 registering with openings 9 in the wall 6 of the fixed rim. The walls of the openings 8 are screwthreaded and the enlargements 7 serve functionally as stationary nuts and may be of such form, brazed or otherwise secured to the outer side of the fixed rim wall 6.

The reference numeral 10 denotes a demountable rim provided with peripheral clencher edges or flanges 11 adapted to retain a conventional form of tire case or tire upon the rim, and the inner side of said rim has spaced lugs or blocks 12 adapted to extend transversely of the fixed rim 1 with one end abutting the wall 6 and the opposite end closing the opening 5 of the wall 4. The lugs or blocks 12 are rectangular in plan and are welded or otherwise secured to the rim 10. Each block has a longitudinal bore or opening 13 registering with the openings 9 and 8 of the wall 6 and enlargements 7 respectively. The outer end of the lug or block completely fills the opening 5 of the wall 4 and arranged against said wall and the end of the lug or block 12 is an angle clip 14 provided with an opening 15 registering with the outer end of the bore 13. Extending through the opening 15, the bore 13 and the opening 9 into the threaded opening 8 is a bolt 16, said bolts having the threaded end thereof in screwthreaded engagement with the enlargement 7 and the opposite end thereof provided with a collar 27 and a rectangular head 17. The former engages the clip 14 and with said clip of greater area than the end of the lug or block 12, the clip and lug are securely retained in engagement with the channel fixed rim of the wheel. The rectangular head 17 permits of a spanner wrench or suitable tool being placed in engagement with the bolt to tighten or loosen the same as occasion requires, and coöperating with the bolt in preventing accidental displacement of the lug or block 12 relative to the fixed rim is a lateral flange 18 on each clip, said flange extending under the fixed rim without interfering with the spoke connections thereof. The clips 14 strengthen or reinforce the wall 4 adjacent the openings 5 and serve practically as a wall, whereby the lugs or blocks 12 can be firmly anchored relative to the inner wall 6 of the fixed rim.

Figure 6:
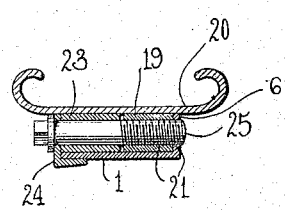

Reference will now be had to Figs. 5 and 6 illustrating a modification of our invention, and instead of providing the outer side of the inner wall 6 of the fixed rim 1 with an enlargement 7, the inner side of said wall is provided with a stationary enlargement 19, riveted or otherwise secured to said fixed rim against the wall 6. The enlargement 19 and the wall 6 of the fixed rim are provided with registering openings 21 having the walls thereof screwthreaded, and the outer end of the enlargement 19 has a tapering or wedge shaped recess 22 adapted to receive the inner end of the tapering or wedge shaped lug or block 23 riveted or otherwise secured to a rim 20. The outer end of the lug or block 23 fits in the opening 5 of the wall 4 of the fixed rim and associated with said lug or block is a clip 24 and a screw bolt 25. The screw bolt 25 extends through the clip 24 and the bore or openings 26 of the lug or block and is screwed into the threaded openings 21. The shape of the lug or block 23 permits of said lug or block and the enlargement 19 being drawn together by the screw bolt 25, whereby the rim 20 and the angle clip 24 will be firmly held by the fixed rim 1 of the wheel. The rim 20 bears upon the walls 4 and 6 of the fixed rim 1 and is held against lateral and vertical displacement, without any danger of the rim shifting during the use of the wheel.

From the foregoing it will be observed that without much exertion or labor a demountable rim can be removed from the fixed rim of the wheel, particularly when a tire has been punctured or otherwise injured and it is necessary to substitute another tire for the injured one. The fastening means used in connection with the demountable rim is not susceptible to injury by stone bruise or its adjustment impaired by dirt or other foreign matter that may accumulate upon the fixed rim of the wheel.

What we claim is:—

1. In a demountable rim, a channel fixed rim, a rim, lugs carried by said rim and extending into said channel fixed rim, enlargements carried by a wall of said fixed rim, clips engaging the other wall of said fixed rim and ends of said lugs and extending under said fixed rim, and means extending through said clips longitudinally of said lugs and engaging said enlargements for holding said rim upon said fixed rim.

2. In a demountable rim, a channel fixed rim having the outer wall thereof provided with openings, enlargements at the inner wall of said channel fixed rim, a rim, lugs carried by said rim and extending into said channel fixed rim with the outer ends of said lugs filling the openings of the outer wall of said fixed rim, angle clips against the outer wall of said fixed rim and extending under said fixed rim, and screw bolts extending through said angle clips, said lugs, and into the enlargements of said channel fixed rim.

3. In a demountable rim, a channel fixed rim, enlargements against the outer side of the inner wall of said channel fixed rim, a rim, lugs carried by said rim and extending into said channel fixed rim with the inner ends thereof abutting the inner wall of said fixed rim and the outer ends thereof extending into the outer wall of said fixed rim, clips of larger area than the outer ends of said lugs arranged against the outer wall of said fixed rim and extending under said fixed rim, and screw bolts extending through said clips longitudinally of said lugs and into the enlargements of said fixed rim for maintaining said rim upon the walls of the fixed rim.

In testimony whereof we affix our signatures in presence of two witnesses.

ANTHONY J. SPRANGER.
BENJAMIN H. HOURTIENNE.

Witnesses:
 ANNA M. DORR,
 CHAS. W. STAUFFIGER.